United States Patent
Abe

[11] Patent Number: 6,148,037
[45] Date of Patent: Nov. 14, 2000

[54] SAMPLING TIMING PHASE ERROR DETECTOR FOR VSB MODULATION SIGNAL

[75] Inventor: Yoshinori Abe, Tokyo, Japan

[73] Assignee: Pioneer Electronics Corporation, Tokyo, Japan

[21] Appl. No.: 08/839,184

[22] Filed: Apr. 23, 1997

[30] Foreign Application Priority Data

Apr. 24, 1996 [JP] Japan .................................. 8-102463

[51] Int. Cl.⁷ .................................................. H04L 27/06
[52] U.S. Cl. ........................ 375/321; 375/326; 375/344; 329/357
[58] Field of Search .................................... 375/270, 321, 375/326, 327, 344, 345, 354, 355, 376; 329/357

[56] References Cited

U.S. PATENT DOCUMENTS

| | | | |
|---|---|---|---|
| 5,471,508 | 11/1995 | Koslov | 375/344 |
| 5,694,419 | 12/1997 | Lawrence et al. | 375/222 |
| 5,742,576 | 4/1998 | Hayashi et al. | 369/59 |
| 5,802,461 | 9/1998 | Gatherer | 455/204 |
| 5,815,536 | 9/1998 | Abe | 375/344 |
| 5,841,814 | 11/1998 | Cupo | 375/321 |
| 5,872,815 | 2/1999 | Strolle et al. | 375/321 |
| 5,909,332 | 6/1999 | Spurbeck et al. | 360/51 |

*Primary Examiner*—Young T. Tse
*Attorney, Agent, or Firm*—Morgan, Lewis & Bockius LLP

[57] ABSTRACT

A sampling timing phase error detector in a VSB modulation signal which can realize a high speed transmission. The sampling timing phase error detector for detecting a timing phase error of a sampling from a discrete time sequence obtained by sampling, by a frequency n·fs (n is a positive integer), a multivalue VSB modulation signal in which transmission symbol sequence of real numbers is processed by a VSB modulation at a symbol frequency fs obtains the timing phase error on the basis of signals obtained by detecting the discrete time sequence at frequencies around a Nyquist frequency fs/2 as a center.

8 Claims, 10 Drawing Sheets

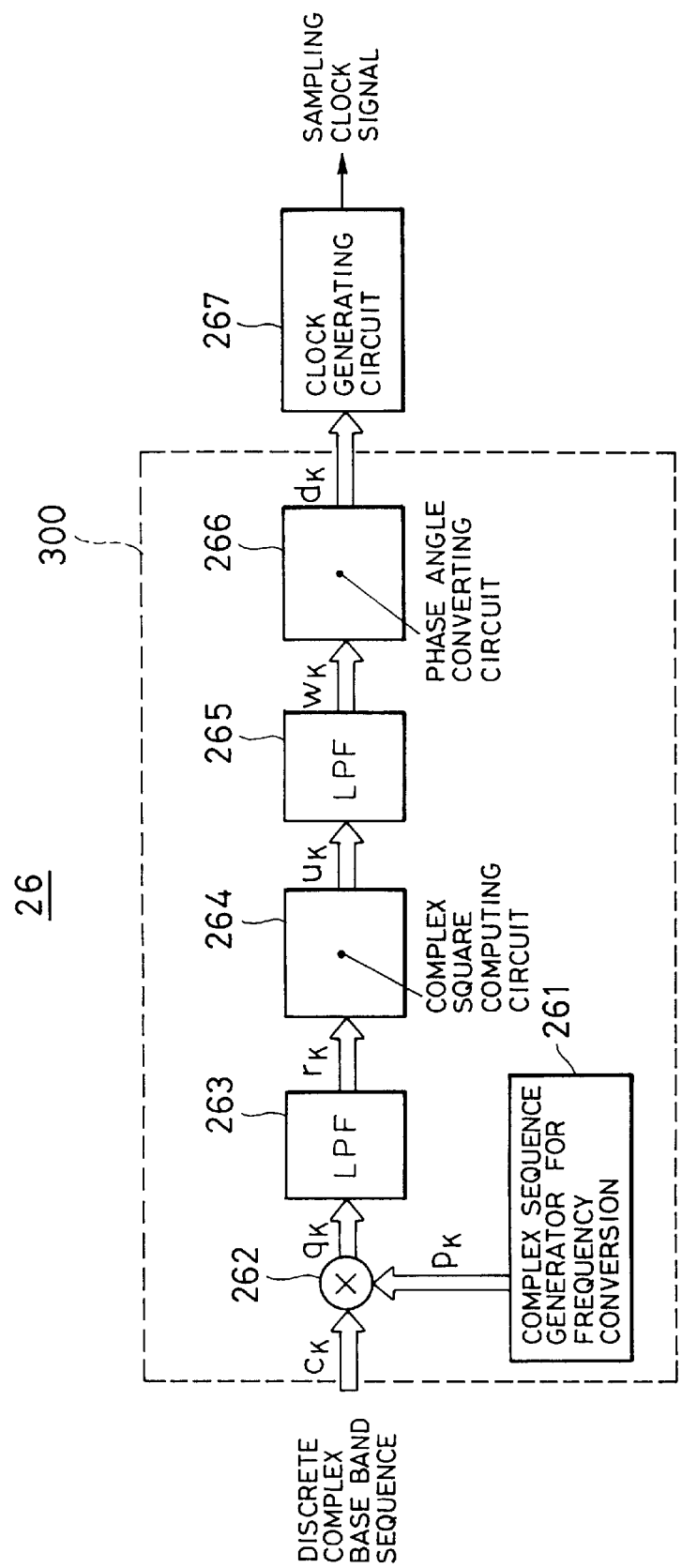

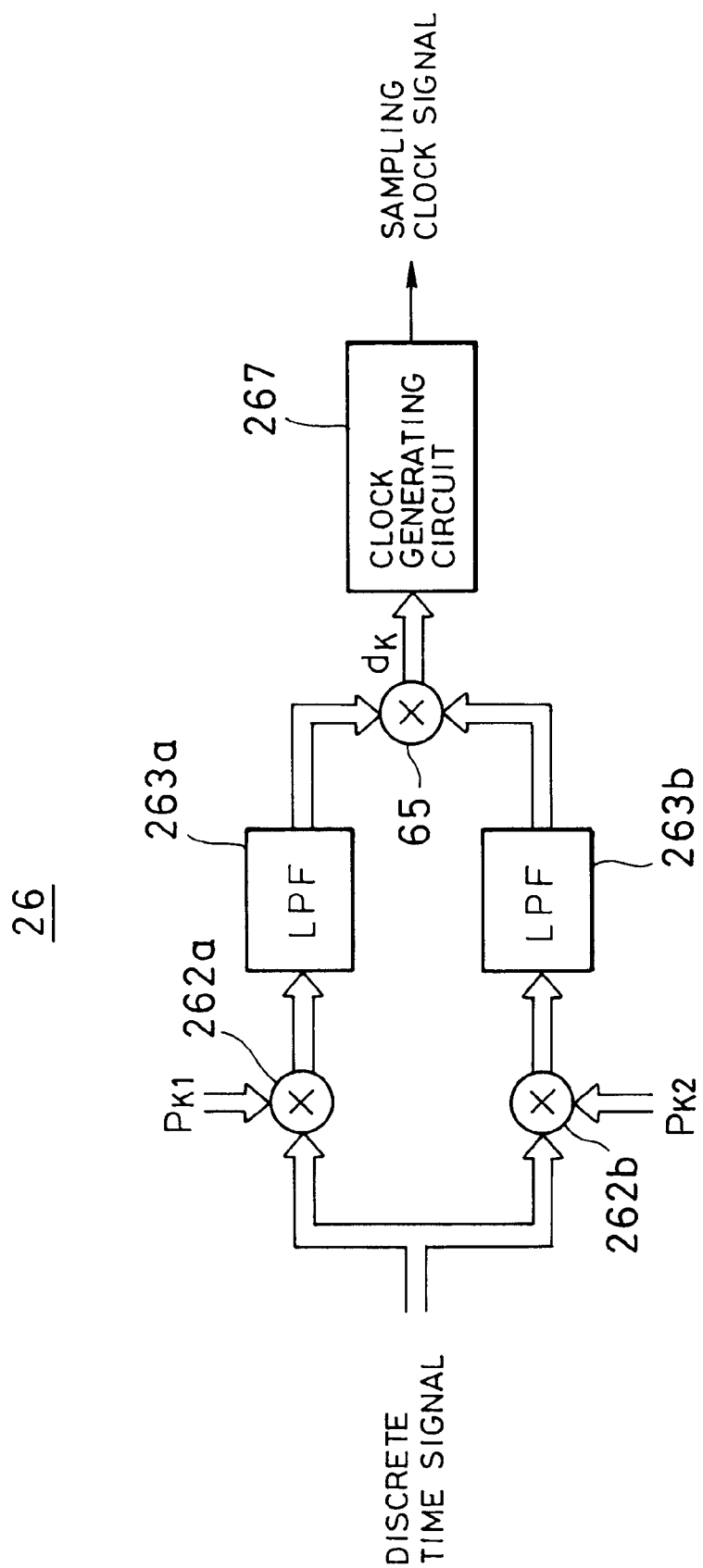

SAMPLING TIMING PHASE ERROR DETECTOR FOR VSB MODULATION SIGNAL

BACKGROUND OF THE INVENTION

1. Field of the Invention

The invention relates to a sampling timing phase error detector for detecting a timing phase error of sampling from a discrete time signal sequence obtained by sampling a multivalue VSB (vestigial sideband: residual sideband) modulation signal.

2. Description of Related Art

A multivalue VSB modulation is known as a modulation method for digitally transmitting information data such as video signal and audio signal.

For example, in a 16-value VSB modulation, coding information data (for instance, error correction coded data) to be transmitted is first converted into a real number value symbol sequence $\{a_k\}$ every four bits. Arbitrary one symbol of the real number value symbol sequence has any one of 16 kinds of real number values. One among the 16 values used is determined by a combination of the 4-bit data.

The real number value symbol sequence $\{a_k\}$ is converted to a 16-value VSB modulation signal r(t) by processes which are expressed by the following equations.

$$g(t) = \sum_{k=-\infty}^{\infty} a_k \cdot y(t - k \cdot T) \quad T = 1/f_s \qquad (1)$$

$$r(t) = \text{real}[g(t) \cdot \exp\{j(2\pi \cdot f_c \cdot t + \theta)\}] \qquad (2)$$

where j: imaginary number unit
$a_k$: transmission symbol sequence
y(t): transmission VSB pulse
g(t): base band VSB modulation signal
T: transmission symbol period
fs: transmission symbol frequency
real[ ]: real part of complex signal in parentheses
fc: carrier frequency A Fourier transform of the transmission pulse y(t) has VSB characteristics as shown in FIG. 1A or 1B. A timing clock synchronized with the transmission symbol frequency (fs=1/T) is time-division multiplexed to the 16-value VSB modulation signal.

The 16-value VSB modulation signal is transmitted to the receiver side through a transmission media.

FIG. 2 is a diagram showing a construction of a 16-value VSB demodulator for demodulating the 16-value VSB modulation signal transmitted through the transmission media.

In FIG. 2, a tuner 1 receives the 16-value VSB modulation signal and converts the 16-value VSB modulation signal into an IF (intermediate frequency) signal while adjusting its local oscillating frequency in accordance with a phase error signal which is supplied from a phase error detecting circuit 3, which will be explained later. The tuner 1 also adjusts a gain of the IF signal in accordance with an AGC signal which is supplied from an AGC (automatic gain control) 2, which will be explained later.

A Nyquist filter 4 shapes a pulse of the IF signal so that overall characteristics with the transmission VSB pulse y(t) become Nyquist characteristics and supplies the pulse shaped signal to a quadrature detector 5. The quadrature detector 5 complex frequency converts the IF signal which was waveform shaped by the Nyquist filter 4, thereby obtaining a complex base band signal. In the diagram, i and j denote a real part and an imaginary part of the complex base band signal, respectively. The phase error detecting circuit 3 presumes a phase angle of a multiplexed pilot from the complex base band signal and negatively feeds back an error between the presumed phase angle and a predetermined phase angle to a VCO in the tuner, thereby allowing a detecting operation without a phase error to be executed. An LPF (low pass filter) 6 supplies a signal obtained by removing unnecessary frequency components such as image spectrum and the like occurring in the detecting step from a real part signal in the complex base band signal to each of the AGC 2, an A/D converter 7, and a timing recovery circuit 8. The AGC 2 generates an AGC signal to adjust a level of a signal supplied from the LPF 6 to a predetermined level and feeds back and supplies the AGC signal to the tuner 1.

The timing recovery circuit 8 extracts a timing clock signal synchronized with the transmission symbol frequency (fs=1/T) from the signal supplied from the LPF 6 and supplies a sampling clock signal which is phase synchronized with the timing clock signal to the A/D converter 7.

The A/D converter 7 samples the signal which is supplied from the LPF 6 every sampling clock signal, thereby obtaining a digital received discrete time signal sequence. An equalizer 9 performs an equalizing process to the received discrete signal sequence, thereby outputting a received discrete time signal sequence in which an interference occurring in a transmission path, a distortion occurring in the apparatus, and the like are eliminated. A symbol value discriminating circuit 10 discriminates whether the received discrete time signal sequence which was subjected to the equalizing process corresponds to any one of the symbol values among 16 values and generates coding information data corresponding to the symbol value. By error correction processing the coding information data by an error correcting circuit (not shown), transmitted information data can be obtained.

As mentioned above, in the 16-value VSB demodulation, the timing clock signal synchronized with the transmission symbol frequency (fs=1/T) is extracted from the transmitted 16-value VSB modulation signal. A digital demodulating process is performed at a timing which is phase synchronized with the extracted timing clock signal.

In the transmission system mentioned above, not only the information data to be transmitted but also the timing clock signal synchronized with the transmission symbol frequency must be multiplexed and transmitted, so that there arises a problem that it becomes an obstacle for realization of a high speed transmission.

OBJECTS AND SUMMARY OF THE INVENTION

The invention is made to solve the above problems and it is an object of the invention to provide a sampling timing phase error detector in a VSB modulation signal which can realize a high speed transmission.

According to the invention, there is provided a sampling timing phase error detector for detecting a timing phase error of a sampling from a discrete time sequence in which a multivalue VSB modulation signal obtained by a VSB modulation of a transmission symbol sequence of real numbers at a symbol frequency fs is sampled by a frequency n·fs (n is a positive integer), wherein the timing phase error is obtained on the basis of signals derived by detecting the discrete time sequence at frequencies around a Nyquist frequency fs/2 as a center.

BRIEF DESCRIPTION OF THE DRAWINGS

FIG. 4 is a diagram showing an example of an internal construction of a timing recovery circuit 26;

FIG. 12 is a diagram showing an example of an internal construction of a timing recovery circuit 26.

DETAILED DESCRIPTION OF THE PREFERRED EMBODIMENT

Figure 1A:
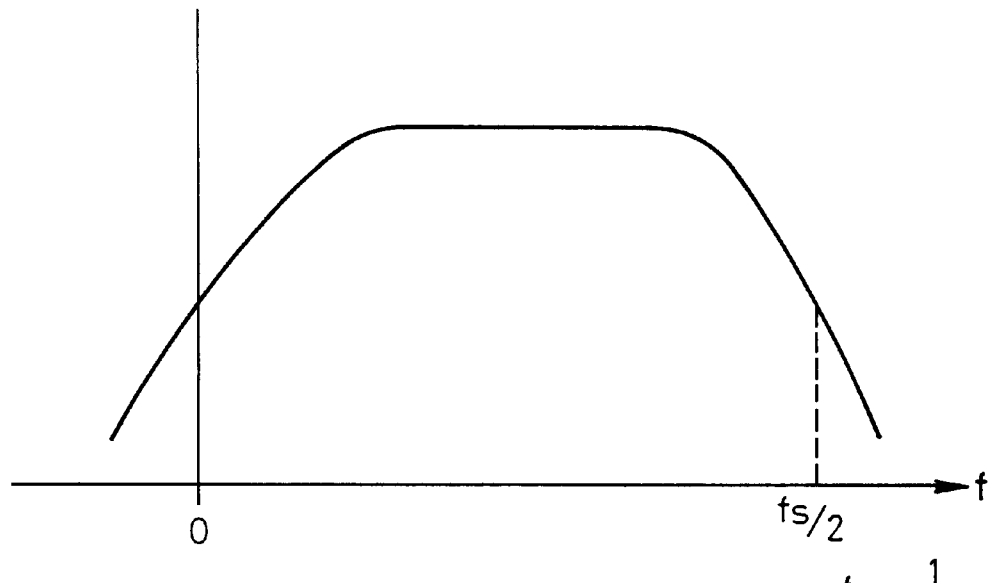
FIGS. 1A and 1B are diagrams showing VSB characteristics.
Figure 1B:
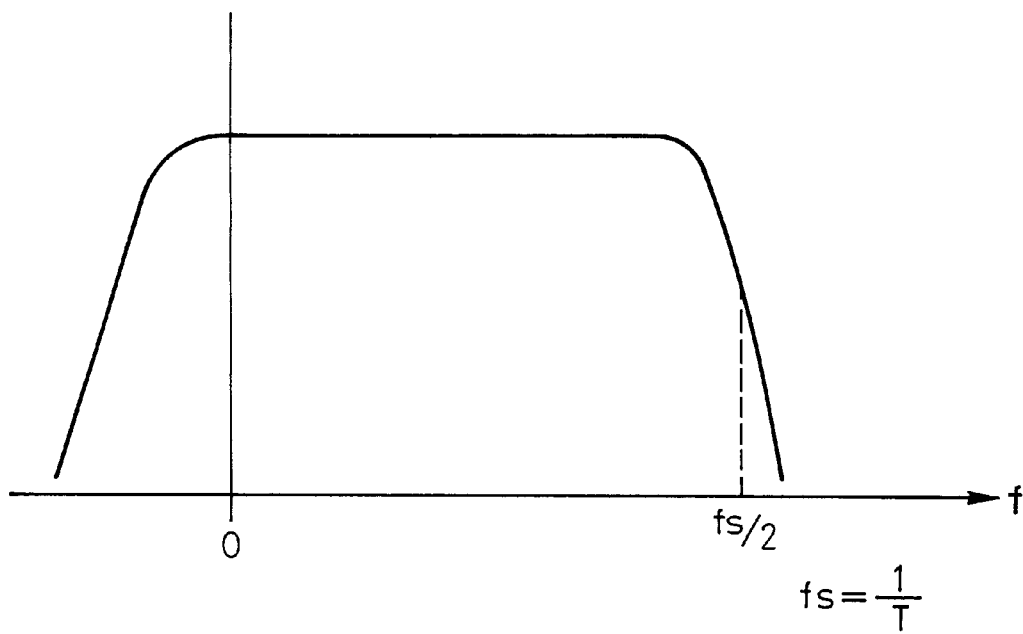
Figure 2:
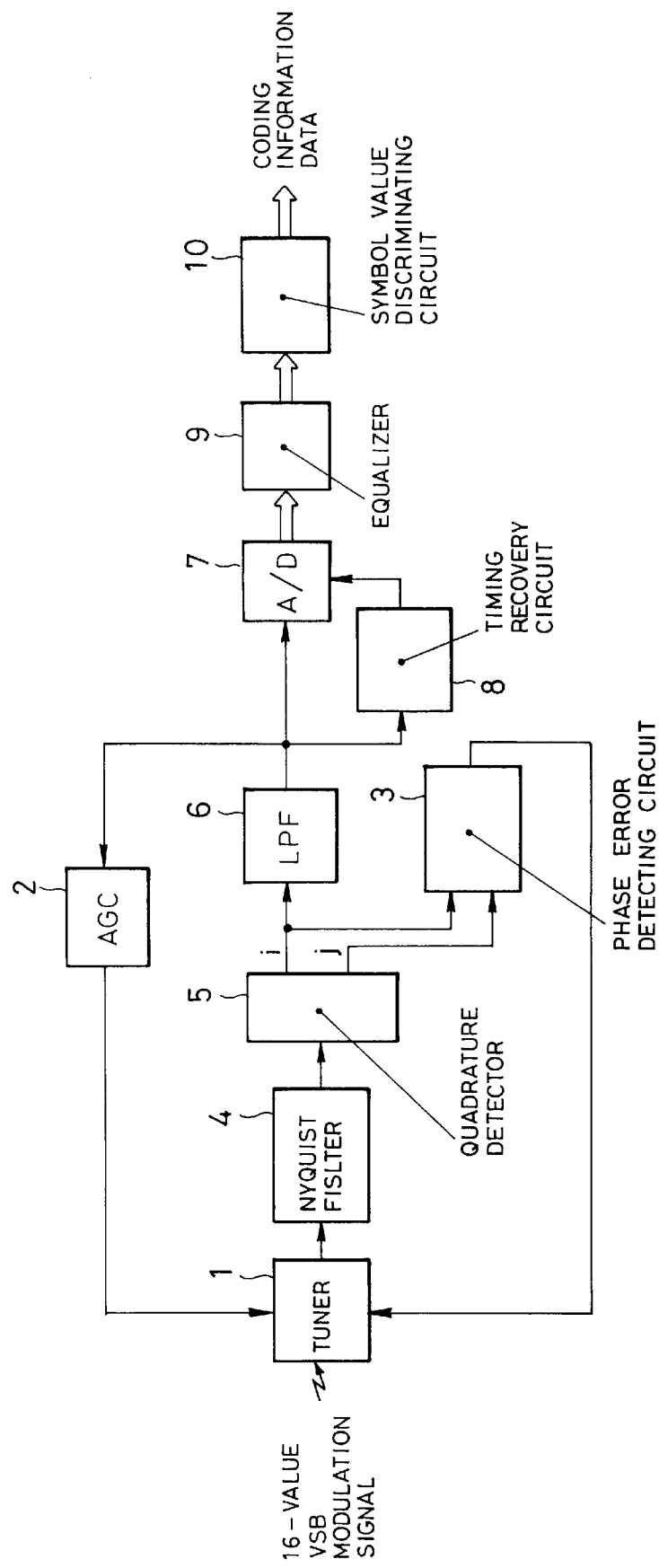
FIG. 2 is a diagram showing a construction of a conventional multivalue VSB demodulator.
Figure 3:
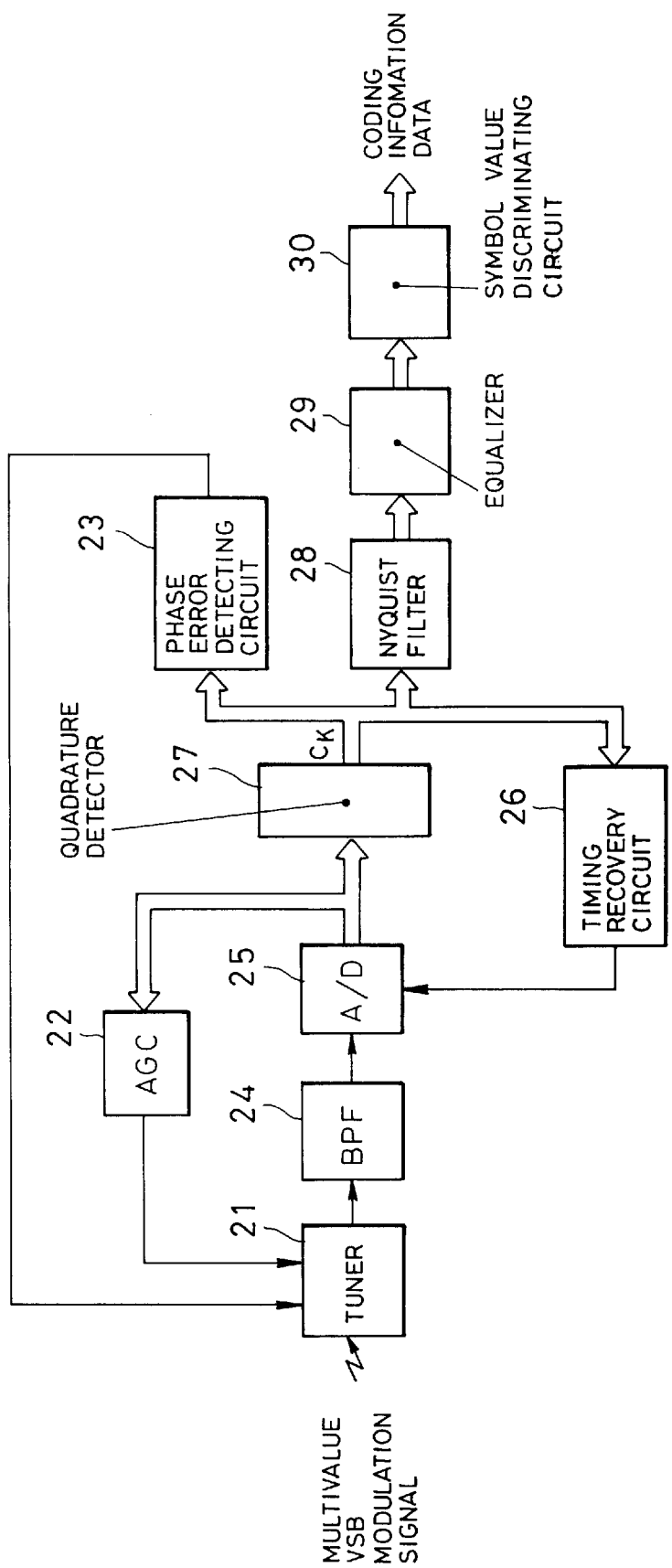
FIG. 3 is a diagram showing a construction of a multivalue VSB demodulator having a sampling timing phase error detector according to the invention.

FIG. 3 is a diagram showing a construction of a multivalue VSB demodulator having a sampling timing phase error detector according to the invention.

In FIG. 3, a tuner 21 receives a multivalue VSB modulation signal which is transmitted through a transmission path from a transmitting apparatus (not shown).

For example, in a transmitting apparatus in which a 16-value VSB modulator is equipped, a coded information data sequence (for example, error correction coded data) to be transmitted is first converted into a real number value symbol sequence $\{a_k\}$ every four bits. One arbitrary symbol in the real number value symbol sequence has any one of 16 kinds of real number values. Which one of the 16 values is used is determined by a combination of the 4-bit data. The real number value symbol sequence $\{a_k\}$ is now converted into a 16-value VSB modulation signal f(t) by operating steps shown by the following equations. The obtained 16-value VSB modulation signal f(t) is transmitted to the transmission path.

$$g(t) = \sum_{k=-\infty}^{\infty} a_k \cdot y(t - k \cdot T) \quad T = 1/f_s \quad (3)$$

$$r(t) = \text{real}[g(t) \cdot \exp\{j(2\pi \cdot f_c \cdot t + \theta)\}] \quad (4)$$

where, j: imaginary number unit
$a_k$: transmission symbol sequence
y(t): transmission VSB pulse
g(t): base band VSB modulation signal
T: transmission symbol period
fs: transmission symbol frequency
real[ ]: real part of complex signal in parentheses
fc: carrier frequency The tuner 21 converts the multivalue VSB modulation signal into an IF (intermediate frequency) signal of a predetermined frequency while adjusting its local oscillating frequency in accordance with a phase error signal which is supplied from a phase error detecting circuit 23, which will be explained later. The tuner 21 also adjusts a gain of the IF signal in accordance with an AGC signal which is supplied from an AGC (automatic gain control) 22, which will be explained later. A BPF (band pass filter) 24 band limits the IF signal so that an A/D converter 25, which will be explained later, doesn't cause an aliasing at the time of the sampling operation and supplies the band limited IF signal derived in this instance to the A/D converter 25.

The A/D converter 25 supplies a digital IF discrete time sequence obtained by sampling the band limited IF signal every sampling clock which is supplied from a timing recovery circuit 26, which will be explained later, to each of the AGC 22 and a quadrature detector 27. The AGC 22 generates an AGC signal to converge each of the IF discrete values in the IF discrete time sequence within a predetermined range and feeds back and supplies it to the tuner 21.

The quadrature detector 27 performs a complex frequency conversion to the IF discrete time sequence sampled as mentioned above, thereby obtaining a discrete complex base band sequence $C_k$. Namely, the quadrature detector 27 multiplies a complex exponential function sequence $\exp\{-(2\pi fc/fsp)kj\}$ corresponding to the IF signal frequency to the IF discrete time sequence which is supplied, thereby obtaining the discrete complex base band sequence $C_k$.

The phase error detecting circuit 23 presumes a phase angle of a multiplexed pilot from the discrete complex base band sequence $C_k$ and negatively feeds back an error between the presumed phase angle and a predetermined phase angle to a VCO in the tuner 21, thereby allowing a detecting operation without a phase error to be executed. A Nyquist filter 28 is constructed by, for example, a complex coefficient FIR filter and performs a pulse shaping so that synthetic characteristics with the transmission VSB pulse y(t) become Nyquist characteristics. The Nyquist filter 28 supplies discrete time signal sequence obtained by re-sampling a real part signal at a symbol rate in the pulse shaped signal to an equalizer 29. By the operation of the Nyquist filter 28, an image spectrum occurring when the IF signal was sampled is removed. The equalizer 29 performs an equalizing process to the discrete time signal sequence which is supplied from the Nyquist filter 28, thereby generating a discrete time signal sequence in which an interference occurring on a transmission path, a distortion occurring in the apparatus, and the like are eliminated. A symbol value discriminating circuit 30 discriminates to which one of multivalue (for example, 16 values) symbol values the received discrete time signal sequence which was subjected to the equalizing process corresponds, and generates coding information data corresponding to the symbol value.

Digital demodulating means for demodulating the original coding information data is formed from the IF discrete time sequence by the quadrature detector 27, Nyquist filter 28, equalizer 29, and symbol value discriminating circuit 30.

The timing recovery circuit 26 detects the discrete complex base band sequence $C_k$ at frequencies around a Nyquist frequency as a center, generates a sampling clock signal of a frequency n·fs (n is a positive integer) which was phase corrected by an amount corresponding to the signal derived at this time, and supplies to the A/D converter 25.

FIG. 4 is a diagram showing an internal construction of the timing recovery circuit 26.

In FIG. 4, a complex sequence generator 261 for frequency conversion generates a complex sequence $p_k$ for frequency conversion shown by the following equation and supplies to a multiplier 262.

$$p_k = exp\{-2\pi(f_s/2f_{sp})jk\} \quad (5)$$

where j: imaginary number unit fsp: sampling frequency

Figure 5A:
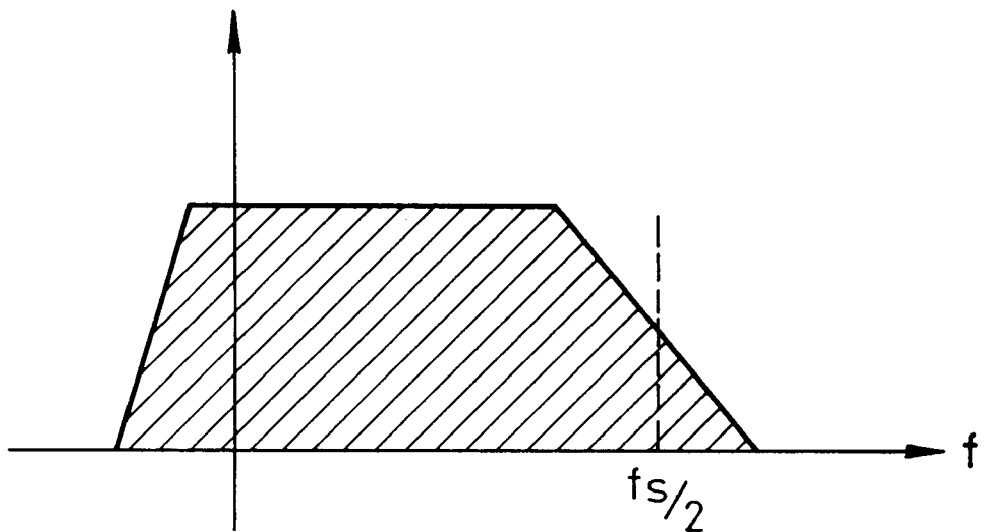
FIGS. 5A and 5B are diagrams showing main side band spectra of a discrete complex base band sequence $C_k$.
Figure 5B:
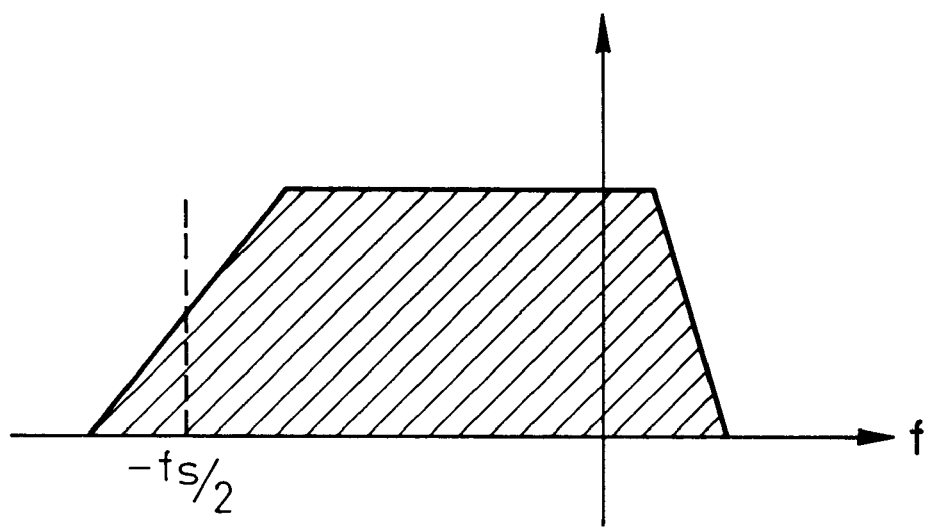

The complex sequence $p_k$ for frequency conversion relates to the case where a main sideband spectrum of the discrete complex base band sequence $C_k$ exists on the positive frequency side as shown in FIG. 5(a). When the main sideband spectrum of the discrete complex base band sequence $C_k$ exists on the negative frequency side as shown in FIG. 5(b), the complex sequence generator 261 for frequency conversion generates a complex sequence $p_k$ for frequency conversion shown by the following equation and supplies to the multiplier 262.

$$p_k = exp\{2\pi(f_s/2f_{sp})jk\} \quad (6)$$

The multiplier 262 complex multiplies the complex sequence $p_k$ for frequency conversion to the discrete complex base band sequence $C_k$, thereby obtaining a complex frequency conversion sequence $q_k$ and supplying to an LPF (low pass filter) 263. That is, the multiplier 262 complex frequency converts the discrete complex base band sequence $C_k$ so that a Nyquist frequency portion in the VSB spectrum of the discrete complex base band sequence $C_k$ becomes a DC component, thereby obtaining the complex frequency conversion sequence $q_k$. By the above operation, timing information corresponding to the transmission symbol timing existing in a surplus region around the Nyquist frequency as will be explained later is extracted as a DC complex component in the complex frequency conversion sequence $q_k$. The LPF 263 supplies a band limited complex sequence $r_k$ in which a signal band of the complex frequency conversion sequence $q_k$ is limited to a frequency lower than fsp/2 to a complex square computing circuit 264 so as not to cause an aliasing at the time of a complex square operation which is executed by the complex square computing circuit 264, which will be explained later. The complex square computing circuit 264 complex square operates the band limited complex sequence $r_k$, thereby obtaining a complex square sequence $u_k$ and supplying to an LPF (low pass filter) 265. The LPF 265 obtains a DC square complex sequence $w_k$ by extracting a DC complex component in the complex square sequence $u_k$ and supplies to a phase angle converting circuit 266. The phase angle converting circuit 266 converts the DC square complex sequence $w_k$ to a phase angle and supplies a timing phase error $d_k$ corresponding to the phase angle to a clock generating circuit 267.

Figure 6:
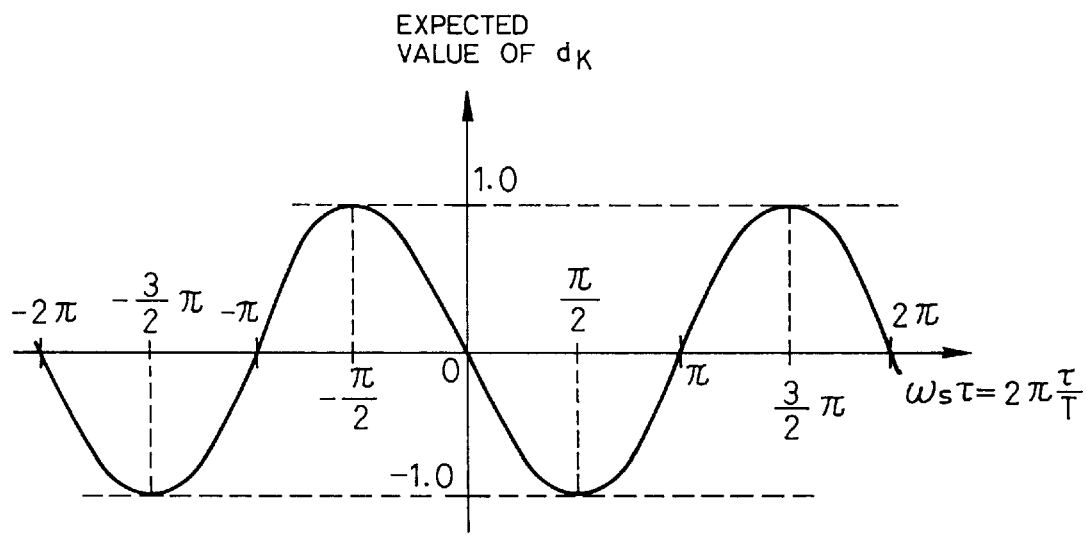
FIG. 6 is a diagram showing phase comparing characteristics in case of using imag(X) as a converting function of a phase angle converting circuit 266.
Figure 7:
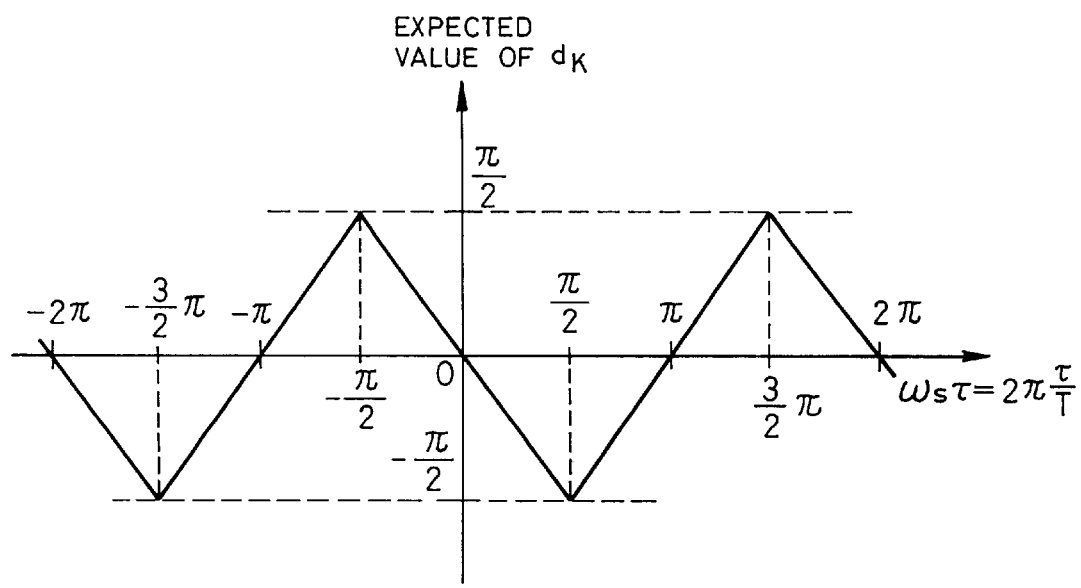
FIG. 7 is a diagram showing phase comparing characteristics in case of using $\tan^{-1}\{\text{imag}(X)/\text{real}(X)\}$ as a converting function of the phase angle converting circuit 266.

FIG. 6 is a diagram showing phase comparing characteristics when imag(X) is used as a converting function of the phase angle converting circuit 266. FIG. 7 is a diagram showing phase comparing characteristics when $tan^{-1}\{imag(X)/real\{X\}\}$ is used as a converting function of the phase angle converting circuit 266.

By a construction comprising the complex sequence generator 261 for frequency conversion, multiplier 262, LPF 263, complex square computing circuit 264, LPF 265, and phase angle converting circuit 266, a sampling timing phase error detector 300 according to the invention for detecting a phase error occurring in the sampling clock is formed.

Figure 8:
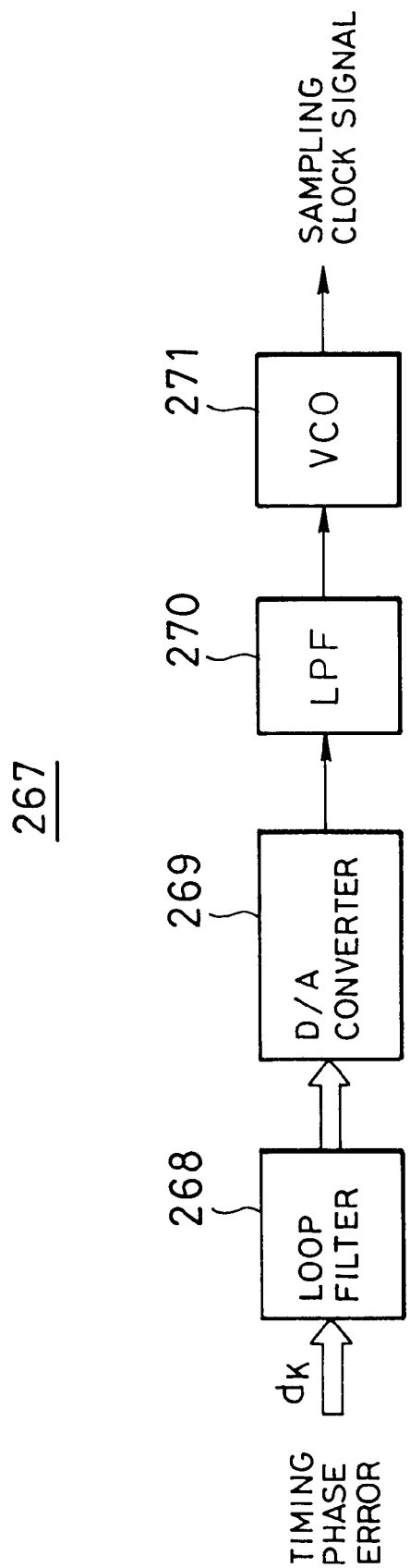
FIG. 8 is a diagram showing an internal construction of a clock generating circuit 267.

For instance, as shown in FIG. 8, the clock generating circuit 267 is constructed by a loop filter 268, a D/A converter 269, an LPF (low pass filter) 270, and a VCO (voltage controlled oscillator) 271 and generates a sampling clock signal of a frequency n·fs (n is a positive integer) which was phase corrected by an amount of a timing error according to the timing phase error $d_k$.

An operation principle of the timing recovery circuit 26 will now be described.

As mentioned above, the base band VSB modulation signal g(t) is shown by the following equation.

$$g(t) = \sum_{k=-\infty}^{\infty} a_k \cdot y(t - k \cdot T) \quad (7)$$

$$T = 1/f_s$$

That is, the base band VSB modulation signal g(t) is obtained by performing a PAM to the transmission symbol sequence $a_k$ by the transmission VSB pulse y(t).

Figure 9:
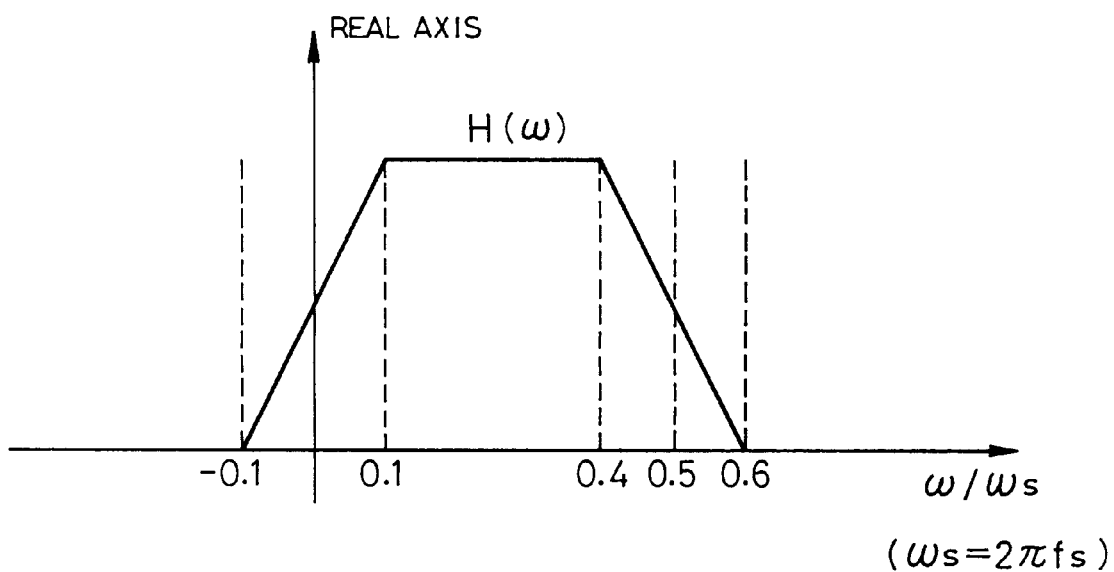
FIG. 9 is a diagram showing a Fourier transform $H(\omega)$ of a transmission VSB pulse y(t)

The transmission VSB pulse y(t) is a complex base region VSB pulse and it is now assumed that its Fourier transform H(ω) is a pure real number function as shown in FIG. 9. Further, it is assumed that y(t) is phase linear and a delay is zero.

The base region VSB modulation signal g(t) is sampled by the sampling frequency fsp that is constant times (n times: n≧2) as large as the transmission symbol frequency fs on the transmission side. Therefore, the discrete complex base band sequence $C_k$ shown by the following equation is supplied to the timing recovery circuit 26 having a construction as shown in FIG. 4.

$$C_k = g(kT_{sp} + \tau)$$

$$T_{sp} = 1/f_{sp} = T/n, \; n \geq 2 \quad (8)$$

where, τ: sampling timing phase

A transfer function E(ω) of the LPF 263 in FIG. 4 is as follows.

$$E(\omega) = |E(\omega)| exp\{j\theta_E(\omega)\} \quad (9)$$

$$\theta_E(\omega) = -\theta_E(-\omega) \quad (10)$$

Figure 10:
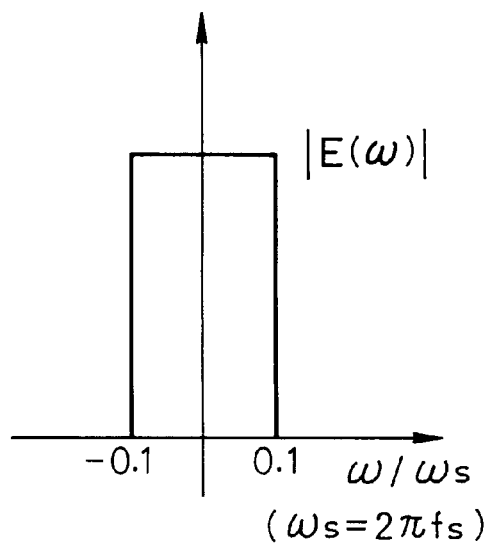
FIG. 10 is a diagram showing gain characteristics of a transfer function $E(\omega)$ of an LPF 263.

In these equations, $|E(\omega)|$ is a gain part of the transfer function and it is assumed that it has characteristics as shown in FIG. 10. It is also assumed that $\theta_E(\omega)$ is a phase part of the transfer function and is an odd function.

Now, assuming that a discrete Fourier transform of the transmission symbol sequence $a_k$ is A(ω) and a Fourier transform of the base band VSB modulation signal g(t) is G(ω), the PAM step shown by the equation (7) can be expressed as follows.

$$G(\omega) = H(\omega)A(\omega) \quad (11)$$

Now, assuming that the discrete Fourier transform of the discrete complex base band sequence $C_k$ is C(ω), a sampling step shown by the equation (8) is as follows.

$$C(\omega) = \sum_{L=-\infty}^{\infty} G(\omega - L\omega_{SP})exp\{-j(\omega - L\omega_{SP})\tau\} \quad (12)$$

Since H(ω) has been band limited by a range $\{-0.1fs\sim0.6fs\}$ as shown in FIG. 9, no aliasing occurs even if the sampling is performed by the sampling frequency of the sampling frequency fsp=nfs.

Therefore, the discrete Fourier transform $C(\omega)$ of the discrete complex base band sequence $C_k$ is as follows.

$$C(\omega)=G(\omega)exp(-j\omega\tau) \quad (13)$$

$$(-\omega_{sp}/2)<\omega<(\omega_{sp}/2)$$

The multiplier 262 in FIG. 4 complex multiplies the complex sequence $p_k$ for frequency conversion $[p_k=\exp\{-2\pi(fs/2fsp)jk\}]$ as mentioned above to the discrete complex base band sequence $C_k$, thereby obtaining the complex frequency conversion sequence $q_k$ shown by the following equation.

$$q_k=C_k \exp\{-2\pi(f_s/2f_{sp})jk\} \quad (14)$$

Now, assuming that a discrete Fourier transform of the complex frequency conversion sequence $q_k$ is $O(\omega)$, the above step can be expressed as follows.

The LPF 263 in FIG. 4 obtains the band limited complex $$O(\omega)=C(\omega+\omega_s/2) \quad (15)$$

$$\omega_s=2\pi f_s$$

sequence $r_k$ in which the complex frequency conversion sequence $q_k$ is band limited.

Now assuming that a discrete Fourier transform of the band limited complex sequence $r_k$ is $R(\omega)$, since the transfer function of the LPF 263 is $E(\omega)$ as mentioned above, $R(\omega)$ is as follows.

$$R(\omega)=E(\omega)O(\omega) \quad (16)$$

By substituting the equations (11), (13), and (15) to the equation (16), $$R(\omega)=|E(\omega)|exp\{j\theta_E(\omega)\}B(\omega)H(\omega+\omega_s/2)exp\{-j(\omega+\omega_s/2)\tau\} \quad (17)$$

where, $$B(\omega)=A(\omega+\omega_s/2) \quad (18)$$

and a range of $\omega$ assumes $$\{(-\omega_{sp}/2)-(\omega_s/2)\}<\omega<\{(\omega_{sp}/2)-(\omega_s/2)\} \quad (19)$$

Since $A(\omega)$ is a discrete Fourier transform of the transmission symbol sequence $a_k$ which is generated at every transmission symbol frequency fs, $$A(\omega)=A(-\omega) \quad (20)$$

$$A(\omega)=A(\omega-L\omega_s) \quad (21)$$

L: arbitrary natural number
are satisfied.

By the above equations (18), (20), and (21), $$B(\omega)=B(-\omega) \quad (22)$$

$$B(\omega)=B(\omega-L\omega_s) \quad (23)$$

L: arbitrary natural number
are obtained.

Subsequently, the complex square computing circuit 264 in FIG. 4 complex squares the band limited complex sequence $r_k$, thereby obtaining the complex square sequence $u_k$.

Now assuming that the discrete Fourier transform of the complex square sequence $u_k$ is $U(\omega)$, since the multiplication in a time region relates to a convolution in a frequency region, $$U(\omega)=(1/2\pi)\int_{X_0}^{X_0+\omega_{SP}} R(X)R(\omega-X)dX \quad (24)$$

is obtained.

Now, attention is paid to the DC component of the complex square sequence $u_k$, $$U(0)=(1/2\pi)\int_{X_0}^{X_0+\omega_{SP}} R(X)R(-X)dX \quad (25)$$

is obtained.

Now assuming that an integration range $X_0$ is defined to $\{(-\omega_{sp}/2)-(\omega_s/2)\}$, since the equation (17) is satisfied in the integration interval, by substituting the integration range and the equations (15), (22), and (23) into the equation (25), $$U(0)=(1/2\pi)\exp(-j\omega_S\tau)Z \quad (26)$$

$$Z=\int_{X_0}^{X_0+\omega_{SP}}|E(X)||E(-X)||B(X)|^2 H(X+\omega_S/2)H(-X+\omega_S/2)dX \quad (27)$$

are obtained.

In the above equations, since all of the functions in the integration relate to the pure real numbers, Z is also a pure real number.

That is, the DC complex component shown by the equation (25) has been multiplexed to the complex square sequence $u_k$ which is generated from the complex square computing circuit 264 in FIG. 4.

The DC complex component is obtained by frequency converting a surplus band around the Nyquist frequency by the multiplier 262 and it is nothing but information indicative of a timing of the transmission symbol as mentioned above. The DC complex component in the complex square sequence $u_k$ is extracted by the LPF 265 in FIG. 4. By further converting the DC complex component to a phase angle by the phase angle converting circuit 266, the timing phase error $d_k$ is obtained.

Namely, in the sampling timing phase error detector 300, the signals obtained by executing the detection at frequencies around the Nyquist frequency as a center to the discrete complex base band sequence $C_k$ obtained by the quadrature detector 27 are set to the timing phase error $d_k$.

According to the timing recovery circuit 26, therefore, the sampling clock signal synchronized with the transmission symbol can be also autonomously formed from the multi-value VSB modulation signal in which the timing clock signal synchronized with the transmission symbol is not multiplexed.

Figure 11:
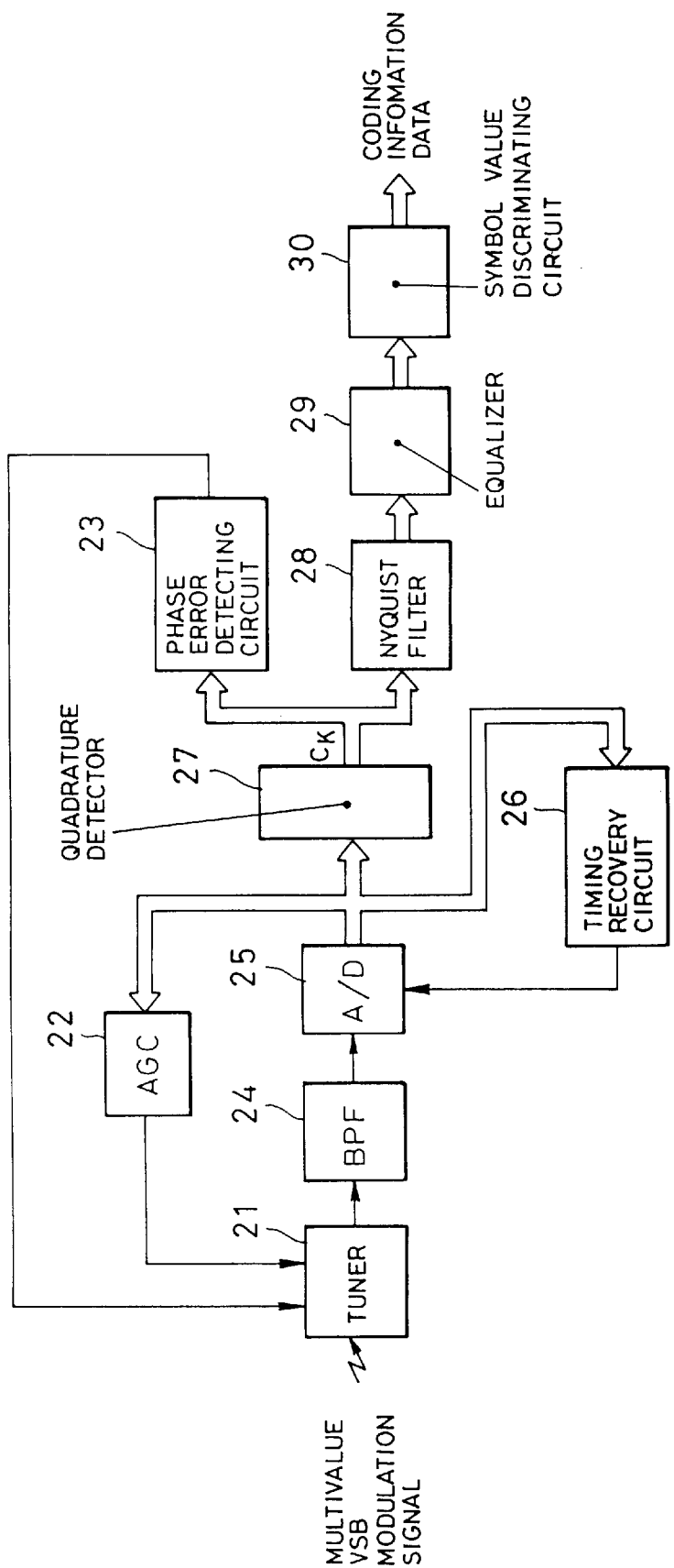
FIG. 11 is a diagram showing another construction of a multivalue VSB demodulator.

In the embodiment, the detection at frequencies around the Nyquist frequency as a center is executed to the discrete complex base band sequence $C_k$ obtained by the quadrature detector 27. As shown in FIG. 11, however, a timing phase error can be also detected similarly even by executing the detection at frequencies around the Nyquist frequency as a center to the IF discrete time sequence from the A/D converter 25.

The complex sequence generator 261 for frequency conversion in the timing recovery circuit 26 generates the complex sequence $p_k$ for frequency conversion shown below and supplies to the multiplier 262.

$$p_k = exp\{-2\pi j(f_c+0.5f_s)/(2f_{sp})\} \quad (28)$$

where, fc: carrier frequency fs: transmission symbol frequency fsp: sampling frequency In brief, it is sufficient to use a construction such that the detection at frequencies around the Nyquist frequency as a center is executed to the discrete time sequence obtained by sampling the multivalue VSB modulation signal which is transmitted by the sampling timing phase error detector 300, thereby detecting a timing phase error of the transmission symbol and the sampling of the multivalue VSB modulation signal is performed by the sampling clock which was phase corrected by an amount corresponding to the timing phase error.

In FIG. 11, functional blocks having the same functions as those of the functional blocks shown in FIG. 3 are designated by the same reference numerals.

In case of using imag(X) of the characteristics shown in FIG. 6 as a converting function of the phase angle converting circuit 266 shown in FIG. 4, the timing recovery circuit 26 can be realized by a construction as shown in FIG. 12.

In FIG. 12, a multiplier 262a supplies a signal obtained by multiplying COS (cosine) sequence $p_{k1}$ of the complex sequence $p_k$ for frequency conversion as mentioned above to the discrete time sequence obtained by sampling the multivalue VSB modulation signal to an LPF (low pass filter) 263a as a real part signal. The LPF 263a extracts a DC component from the real part signal and supplies to a multiplier 65. A multiplier 262b supplies a signal obtained by multiplying SIN (sine) sequence $p_{k2}$ of the complex sequence $p_k$ for frequency conversion to the discrete time sequence to an LPF (low pass filter) 263b as an imaginary part signal. The LPF 263b extracts a DC component from the imaginary part signal and supplies to the multiplier 65. The multiplier 65 supplies a signal obtained by multiplying the signals supplied from the LPFs 263a and 263b to the clock generating circuit 267 as a timing phase error $d_k$. The clock generating circuit 267 generates a sampling clock signal of a frequency n·fs (n is a positive integer) which was phase corrected by an amount of the timing error according to the timing phase error $d_k$.

According to the invention as mentioned above, by considering the fact that the information component which reflects the timing of the VSB modulation signal which is transmitted exists in only the surplus band around the Nyquist frequency, the information component is extracted, thereby detecting the phase error of the sampling timing.

According to the sampling timing phase error detector of the invention, the sampling can be performed at a timing which is phase synchronized with the transmission symbol even from the multivalue VSB modulation signal in which the timing clock signal synchronized with the transmission symbol is not multiplexed.

A high speed transmission, consequently, in which there is no need to transmit the timing clock signal can be realized.

The present invention has been described above with reference to the preferred embodiment. It will be understood that a person with ordinary skill in the art can make various modifications and variations. All of the modifications and variations are included in the scope of claims of the invention.

What is claimed is:

1. A sampling timing phase error detector for detecting a timing phase error of a sampling from a discrete time sequence obtained by sampling a multivalue VSB modulation signal, at a frequency n·fs (n is a positive integer), which is obtained by a VSB modulation of a transmission symbol sequence of real numbers with a symbol frequency fs, wherein said timing phase error is obtained on the basis of signals obtained by detecting said discrete time sequence at frequencies around a Nyquist frequency fs/2 as a center.

2. A sampling timing phase error detector for detecting a timing phase error of a sampling from a discrete time sequence obtained by sampling a multivalue VSB modulation signal, at a frequency n·fs (n is a positive integer), which is obtained by a VSB modulation of a transmission symbol sequence of real numbers with a symbol frequency fs, comprising:

frequency converting means for obtaining complex frequency conversion sequence by complex frequency converting said discrete time sequence so that a Nyquist frequency fs/2 of said discrete time sequence forms a DC component;

complex square computing means for obtaining a complex square sequence by a complex squaring of said complex frequency conversion sequence;

a filter for extracting a DC complex component from said complex square sequence and setting said DC complex component to said timing phase error; and phase angle converting means for converting said DC complex square sequence to a phase angle to generate said timing phase error.

3. A detector according to claim 2, wherein said frequency converting means comprises:

a complex sequence generator for frequency conversion for generating complex sequence for frequency conversion which is expressed by $exp\{-2\pi j(fc+0.5fs)/(2f_{sp})\}$ where fc is a carrier frequency, fs is said symbol frequency, fsp is a sampling frequency; and a multiplier for multiplying said complex sequence for frequency conversion to said discrete time sequence and obtaining a multiplication result as said complex frequency conversion sequence.

4. A sampling timing phase error detecting method of detecting a timing phase error of a sampling from a discrete time sequence obtained by sampling, by a frequency n·fs (n is a positive integer), a multivalue VSB modulation signal in which a transmission symbol sequence of real numbers was VSB modulated at a symbol frequency fs, comprising the steps of:

obtaining a complex frequency conversion sequence by complex frequency converting said discrete time sequence so that a Nyquist frequency fs/2 of said discrete time sequence forms a DC component; and obtaining said timing phase error on the basis of a signal obtained by detection of said discrete time sequence.

5. A sampling timing phase error detecting method of detecting a timing phase error of a sampling from a discrete time sequence obtained by sampling, by a frequency n·fs (n is a positive integer), a multivalue VSB modulation signal in which transmission symbol sequence of real numbers was VSB modulated at a symbol frequency fs, comprising the steps of:

obtaining complex frequency conversion sequence by complex frequency converting said discrete time sequence so that a Nyquist frequency fs/2 of said discrete time sequence forms a DC component;

obtaining a complex square sequence by a complex squaring of said complex frequency conversion sequence obtained;

extracting a DC complex component from said complex square sequence obtained; and obtaining said timing phase error on the basis of said extracted DC complex component.

6. A method according to claim 5, wherein said step of obtaining the complex frequency conversion sequence by complex frequency converting said discrete time sequence further includes the steps of:

generating complex sequence for frequency conversion which is expressed by $\exp(-2\pi j(fc+0.5fs)/(2f_{sp}))$ where fc is a carrier frequency, fs is said symbol frequency, fsp is a sampling frequency; and obtaining said complex frequency conversion sequence by multiplying said generated complex sequence for frequency conversion to said discrete time sequence.

7. A sampling timing phase error detector for detecting a timing phase error of a sampling from a discrete time sequence obtained by sampling a multivalue VSB modulation signal, at a frequency n·fs (n is a positive integer), which is obtained by a VSB modulation of a transmission symbol sequence of real numbers with a symbol frequency fs, wherein said timing phase error is obtained on the basis of signals obtained by detecting said discrete time sequence at frequencies around a Nyquist frequency fs/2 as a center, such that a sampling clock signal synchronized with the transmission symbol sequence can be autonomously formed from the multivalue VSB modulation signal.

8. A sampling timing phase error detector for detecting a timing phase error of a sampling from a discrete time sequence obtained by sampling a multivalue VSB modulation signal, at a frequency n·fs (n is a positive integer), which is obtained by a VSB modulation of a transmission symbol sequence of real numbers with a symbol frequency fs, comprising:

a signal input for receiving a sampling from said discrete time sequence;

a detector for detecting said discrete time sequence at frequencies around a Nyquist frequency fs/2 as a center; and circuitry for detecting said timing phase error of the sampling based on signals obtained by the detector for detecting said discrete time sequence.

* * * * *